Oct. 21, 1958     F. C. MIKLAS     2,856,843
LIQUID HEATING AND METERING CONSTRUCTION
Filed Aug. 2, 1957
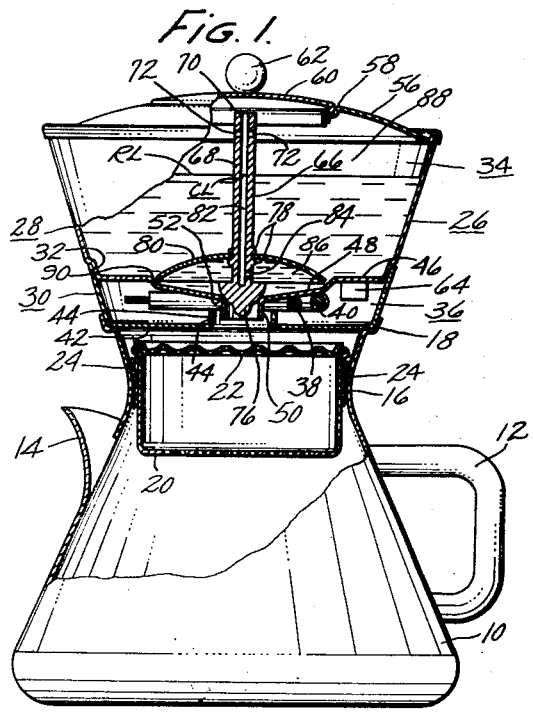
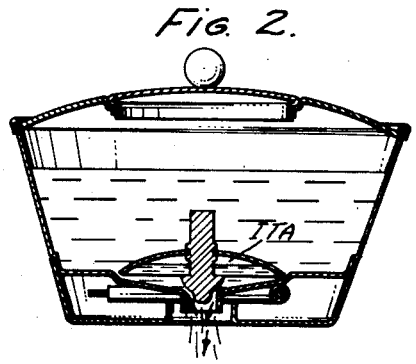
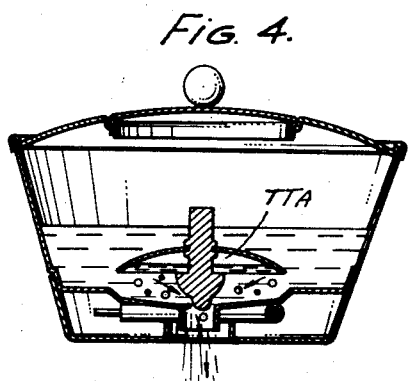
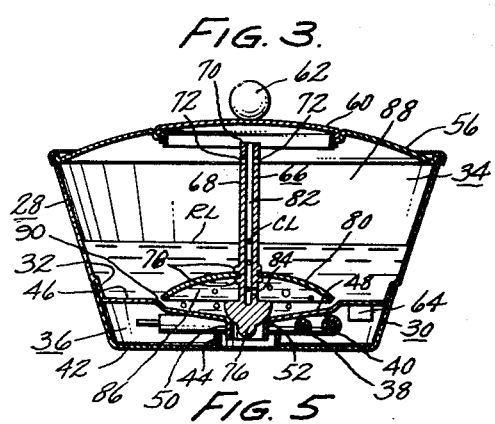
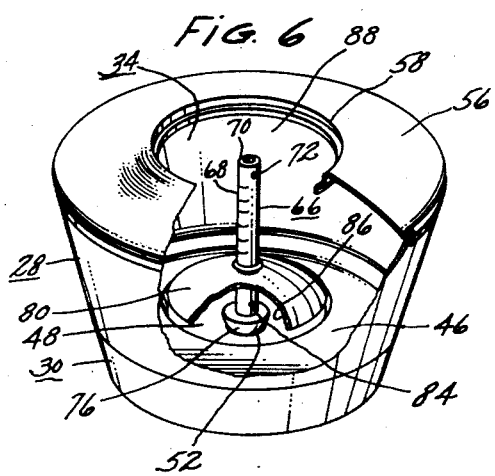
Inventor:
Frank C. Miklas
by Armand Cifelli
His Attorney United States Patent Office 2,856,843
Patented Oct. 21, 1958

2,856,843

LIQUID HEATING AND METERING CONSTRUCTION

Frank C. Miklas, Allentown, Pa., assignor to General Electric Company, a corporation of New York Application August 2, 1957, Serial No. 675,958

9 Claims. (Cl. 99—282)

The present invention relates to liquid heating and metering devices and particularly to those which are able to heat successive charges of liquid to a substantial uniform temperature, and to uniformly meter the flow of such heated charges. The invention contemplated by the instant application may have broad and varied applications. However, for the sake of clarity and simplicity in disclosure, and for the further reason that it is eminently well suited for incorporation in an automatic, electric, drip-type, coffee maker, it will be herein illustrated and described in such an environment.

The liquid heating and metering art has exerted much effort to produce a construction which will automatically and quickly operate to provide a uniformly metered flow of uniformly heated liquid. Some of the problems which it has had to contend with are: (1) shortening preheat time, that is, providing for quickly heating the liquid to the desired temperature and promptly starting the metering thereof; (2) eliminating any initial flow of unheated liquid; and (3) avoiding the natural tendency in devices of this type to provide a continuous terminal flow of liquid.

It is an object of this invention to provide a liquid heating and metering construction which is able to quickly and automatically heat liquid to a substantially uniform temperature and meter it at a substantially uniform rate of flow during its complete period of operation.

It is another object of this invention to provide an improved, automatic, electric, drip-type coffee maker which includes a liquid heating and metering construction of the type set forth in the preceding paragraph.

It is still another object of this invention to provide an improved coffee maker of the type set forth in the preceding paragraph which includes the further desirable attributes of providing for the easy, accurate measuring of water which has been added to the coffee maker and the convenient handling of the parts of the liquid heating and metering construction, particularly during the initial filling of the coffee maker with water to be brewed into coffee.

The above objects are achieved in one form of the invention by providing a liquid heating and metering construction which includes a reservoir for receiving liquid, an opening surrounded by a valve seat in the bottom of the reservoir, a removable valve assembly that includes: a valve plug which is adapted to cooperate with the valve seat, a lifting cap and an upwardly extending tube which has a passage that communicates with the space under the lifting cap and the space above the liquid, and means for heating the liquid in the reservoir under the lifting cap. The operation of the improved liquid heating and metering construction is such as to: (1) shorten preheat time by minimizing the escape of vapor up through the lifting cap during initial heating of the liquid which is disposed under the lifting cap in the reservoir; (2) eliminate an initial, undesired flow of unheated water, which would occur when liquid is initially added to the reservoir if air were trapped under the lifting cap and no means for venting the trapped air to the atmosphere were provided, due to the positive vent afforded by the passage in the tube; and (3) avoid a constant flow of liquid during the terminal portion of operation, which would occur when the liquid under the lifting cap boils briskly toward the end of a heating and metering operation, by allowing a vapor escape up through the passage in the tube.

Other objects and further details of that which I believe to be novel and my invention will be clear from the following description and claims taken with the accompanying drawings wherein:

Fig. 1 is a vertical, generally sectional view taken through an improved, automatic, electric, drip-type coffee maker which includes the improved liquid heating and metering construction;

Fig. 2 is a vertical, sectional view taken through a prior art, liquid heating and metering construction on its initially being filled with liquid;

Fig. 3 is a vertical, sectional view of the liquid heating and metering construction of Fig. 1 showing the parts as they are disposed at the terminal portion of a heating and metering operation;

Fig. 4 is a view corresponding to Fig. 3, but showing the Fig. 2 construction at the terminal portion of a heating and metering operation;

Fig. 5 is a perspective view of the improved valve assembly with a portion thereof broken away for the sake of clarity, and Fig. 6 is a fragmentary perspective view with portions broken away of the reservoir, looking into it with the valve assembly in position and the cover removed.

In Fig. 1 there is illustrated an improved, automatic, electric, drip-type coffee maker which includes the improved liquid heating and metering construction. The coffee maker comprises a decanter 10 which is provided with a handle 12 and a spout 14; the decanter 10 includes a pot-like receptacle having an upper restricted neck 16 and terminates in a flared, upper, open end which forms an upwardly facing, circular seat 18. Cup-shaped coffee basket 20, which has its bottom perforated and its top open and spun over to form a seat for disc-like, perforated spreader 22, is removably positioned in the decanter 10 in its Fig. 1 position. A plurality of inclined extensions 24 are secured to the exterior of said coffee basket at opposite sides thereof, and they are adapted to make contact with the neck 16 of the decanter 10 when the coffee basket is mounted in assembled position and thereby support the coffee basket.

Removably supported on the circular seat 18 of the decanter 10 is a liquid storing and heating reservoir 26, which is illustrated as being in the form of a truncated cone; the reservoir 26 is fabricated out of a plurality of parts, principally an upper, cup-shaped part 28 and a lower, cup-shaped part 30, which are firmly secured to each other. It will be seen in Fig. 1 that the open, flared top of the lower, cup-shaped part 30 fits snugly on a shoulder 32 formed near the bottom of the upper, cup-shaped part 28. The two cup-shaped parts compartment the reservoir 26 into an open, upper, liquid receiving compartment 34 and a lower compartment 36, which is disposed between the cup-shaped parts and houses a pair of individual heating elements 38 and 40. The bottom wall 42 of the lower, cup-shaped part 30 is centrally apertured and has an upwardly extending, cylindrical collar 44 surrounding the aperture. In the bottom wall 46 of the upper cup-shaped part, there is formed a central, dished portion 48 and a central opening surrounded by a downwardly extending collar 50. The inter-section of the dished portion 48 and the collar 50 forms a circular valve seat 52. Secured to the top of the upper, cup-shaped part 28 is an annular, dished wall 56, which has a central opening 58 that is closed by a removable, circular cover 60, which includes a knob 62 for manual gripping.

Although not illustrated in the drawings, the coffee maker illustrated in Fig. 1 is equipped with appropriate electrical wiring to provide for the energization of the heating elements 38 and 40, and in its preferred form includes a heat responsive, electrical switch mechanism, which is generally indicated by reference numeral 64 and may be of any known type. Switch mechanism 64 will operate to: (1) de-energize one of the heating elements near the midpoint of an operation, when the amount of liquid in the liquid compartment 36 has been reduced, and that liquid which remains has been substantially heated due to heat introduced by conduction, convection and steam penetration, in order to reduce the amount of heat supplied to the reservoir at this time; and (2) de-energize both heating elements when substantially all of the liquid has been dissipated out of the liquid compartment 34. Since many known thermally responsive, electrical switching mechanisms could be utilized, the details of construction of switch mechanism 64 are not illustrated and described in this application, it solely being necessary that it be realized that such a mechanism be included in the preferred form of coffee maker embodying the invention.

The improved coffee maker includes the foregoing structure and the improved valve assembly 66. By reference to Figs. 1 and 5, it is believed that the construction of the valve assembly will be clear. The valve assembly 66 comprises an elongated tube 68 that may be open at its upper end 70 and is provided with a pair of openings 72 near said upper end, and which is closed at its lower end 74 and supports an integral valve plug 76 at said lower end. Upwardly spaced from the valve plug 76 on the exterior of the tube 68 are formed a pair of spaced, radially projecting, annular ribs 78. Ribs 78 function to securely mount the lifting cap 80, which is in the nature of a dished disc, on the tube 68. Throughout most of its length, the tube 68 has an elongated passage 82, which extends from the open end 70 to a point near where the valve plug 76 is located. An opening 84 extends radially through the side of the tube 68 and connects the passage 82 with the space between the lifting cap 80 and the valve plug 76.

Fig. 1 illustrates the coffee maker components assembled for use. It will there be observed that when ready for use, the valve assembly 66 is disposed within the liquid compartment 34 in such a manner that: the tube 68 extends generally vertically upwardly; the valve plug 76 rests on the valve seat 52, and the lifting cap 80 is disposed relative to the bottom 46 of the upper, cup-shaped part 28 so as to form a temporary, liquid heating chamber 86 generally between the lifting cap 80 and the dished portion 48 of the bottom wall 46, and a temporary, liquid storage chamber 88 which comprises substantially the remainder of the compartment 34. It should be noted that the two temporary chambers formed when the valve assembly 66 is mounted in operative position communicate with each other through a temporary, annular slot 90 formed by the peripheral edge of the lifting cap 80 and the bottom wall 46 of the upper, cup-shaped part 28.

Fig. 1 illustrates the coffee maker after the valve assembly has been positioned and liquid, which in the instance of a coffee maker will be water, has been filled in the liquid compartment 34 to the level RL. It will be noted from Fig. 1, that at this time a column of water is disposed within the passage 82 of the tube 68 up to the level CL, and that the levels RL and CL are substantially the same. This obtains, because the construction of the tube 68 provides positive venting of any air that would be trapped under the lifting cap 80 while the liquid compartment is being filled with water. It will be noted that any air trapped under the lifting cap 80 would be forced through the opening 84, upwardly through the passage 82 in the tube 68, and out the openings 70 and 72 to the atmosphere, it being understood that the cover 60 is removed at the time water is added. Although this may appear to be a relatively uncomplicated phenomenon, it should be noted that failure to provide positive venting would result in an undesired, initial flow of unheated water, for this occurs when trapped air renders the valve assembly sufficiently buoyant to lift the lifting cap 80 and dislodge the valve plug 76 off of the valve seat 50. This is generally undesirable in liquid heating and metering constructions, and particularly undesirable when brewing coffee in a coffee maker, for it is generally recognized by coffee brewing experts to be undesirable to have cold water contact the coffee grounds. It should be noted in Fig. 2 that in the prior art construction there illustrated, wherein the improved valve assembly is not present that this undesirable condition exists, for a certain quantity of trapped air ITA will form during filling, and ultimately dislodge the prior art, valve plug off of the valve seat and allow an undesirable, initial flow of unheated water, as illustrated by the schematic arrows in Fig. 2.

Assuming that the parts are disposed as in Fig. 1 and water has been filled in the liquid compartment 34, the operation of the device follows the energization of the heating elements 38 and 40, either by inserting an electrical plug (not shown) in a domestic, electrical outlet, or by actuating a manual switch button or lever (not shown), if the latter is provided. Energization of the heating elements 38 and 40 causes rapid heating of the water in the temporary heating chamber 86, and boiling results causing agitation of the water and the formation of bubbles of vapor which collect under the lower surface of the lifting cap 80. Upon exertion of a sufficient, upwardly directed force caused by both the bubbles of vapor and the agitated water, the lifting cap 80 will be urged upwardly and it will move the entire valve assembly 66, resulting in the unseating of the valve plug 76 off of the valve seat 52, which results in allowing the heated water to flow downwardly through the opening surrounded by the collar 50 and onto the spreader 22; the spreader will disperse the heated water over the surface of the coffee grounds in the coffee basket 20 and the heated water will seep through the coffee grounds and escape through the perforations in the bottom wall of the coffee basket and fall to the bottom of the decanter 10 and collect there. The flow of the heated water downwardly out of the temporary heating chamber 86 results in reduction of pressure in the temporary heating chamber, which allows the valve assembly 66 to move downwardly into its seated position wherein the valve plug 76 rests on the valve seat 52. This will be simultaneously accompanied by a transfer of cool liquid from the temporary storage chamber 88 through the temporary annular slot 90 into the temporary heating chamber 86. It should be noted here that as on initial filling of the liquid compartment 34, any air trapped under the lifting cap 80 may vent through the opening 84, passage 82 and openings 70 and 72. The only distinction between the trapped air venting action occurring after the first charge of water has been boiled and flown off, and the trapped air venting action occurring on initial filling of the liquid compartment, is that there is a column of liquid in the passage 82 in the former instance and the trapped air has to vent through the column of liquid. When the cool liquid fills the temporary heating chamber 86 and the trapped air vents through the passage 82, the level CL of the column of liquid will lower slightly so as to be at the same level as the level RL of liquid in the compartment 34.

Operation continues and the new charge of water in the temporary heating chamber 86 is heated, again resulting in its being agitated and in the formation of bubbles of vapor, and this, again, results in the exertion of an upward lifting force on the lifting cap 80 and, again, results in dislodgement of the valve plug 76 off of the valve seat 52, and in a downward flow of a second charge of heated water onto the spreader 22.

This action of heating successive charges of water and metering them continues for most of the operation. Toward the end of the operation, the level of liquid in the liquid compartment 34, as well as in the passage 82 of the tube 68, will have fallen substantially; this condition is illustrated in Fig. 3. At this time, the liquid that remains in the temporary storage chamber 88 will have become heated up due to conduction, convection and steam penetration. Therefore, as this liquid becomes hotter, the time required to produce the necessary boiling, agitation and formation of bubbles of air is reduced, and this results in a tendency toward an increased rate of flow of heated water out through the opening surrounded by the collar 50. In order to prevent this undesired, increased terminal flow, which may approximate a continuous flow under some conditions, the instant construction performs the following two functions: first, one of the heating elements, either 38 or 40, is de-energized by the thermal responsive switch 64, which is set to de-energize one of the heating elements in response to the water in the temporary storage chamber 88 reaching a predetermined, and empirically determined, temperature which is calculated to be reached at the time during operation when prior art constructions were prone to produce an increased, undesired rate of flow; and second, the passage 82 in tube 68 of the valve assembly 66 functions to allow a vapor escape through which bubbles of air may readily pass. This obtains, because the column of liquid in the passage 82 of the tube 68 will have fallen substantially at the terminal portion of operation, and will offer relatively little resistance to the escape of bubbles of air. This is illustrated in Fig. 3 wherein it will be seen that a large number of bubbles of air will pass through the opening 84 up through the column of liquid in the passage 82. The cumulative effect of reducing the heat input and providing the vapor escape at the terminal portion of operation is such as to reduce the rate of flow of heated liquid substantially as compared with prior art devices, which operate as illustrated in Fig. 4 at the terminal portion of operation and allow the collection of a substantial amount of trapped air TTA resulting in the valve plug being dislodged from the valve seat and liquid flowing substantially continuously.

From the foregoing it will be apparent that an improved liquid heating and metering construction has been provided which is of general utility and which particularly lends itself to ready incorporation in an automatic, electric, drip-type coffee maker. When used for general purposes, it meters substantially uniformly heated liquid at a substantially uniform rate. Although complete uniformity as to both rate of flow and temperature is not achieved, substantial uniformity is! Additionally, it has been found in practice that the improved liquid heating and metering construction reduces pre-heat time, eliminates an undesirable initial flow of unheated liquid on filling, delivers liquid at a 30% faster rate early in the operation, and retards the flow rate of liquid approximately 50% late in operation. All of the foregoing represents a significant improvement in liquid heating and metering constructions generally.

When incorporated in an automatic, electric, drip-type coffee maker, the improved liquid heating and metering construction provides additional functional advantages and conveniences. To fully appreciate this, it is necessary that certain considerations peculiar to coffee brewing be kept in mind. Experts in the coffee brewing field believe that in order to produce excellent coffee brew, it is desirable that: (1) properly uniformly heated water pass through the coffee grounds once; (2) cold water not contact the coffee grounds; (3) water that is too hot not contact the coffee grounds, and (4) all of the water contact the coffee grounds. Deviations from the above result in a coffee brew which is unsatisfactory in some manner; therefore, it is desirable that a coffee maker function in a manner consistent with these considerations.

Added to the foregoing considerations are the practical considerations of reducing the amount of time required to brew coffee to a minimum, for in appliances of this nature, which are utilized principally at breakfast, time is of the essence and speed is imperative. Therefore, in addition to satisfying the considerations intended to produce a good coffee brew, it is desirable that the preheat time be minimized, i. e., the amount of time which elapses before brewing starts. The instant invention, satisfies this demand. It should be particularly noted, that even though in the improved liquid heating and metering construction, a positive air vent has been provided which operates: (a) initially to prevent the entrapment of air under the lifting cap; and (b) terminally to allow the escape of a vapor; that the positive air vent does not detract from the ability of the construction to reduce preheat time to effect rapid heat-up.

Lengthy preheat time is a particular problem in prior art arrangements which include means for venting in the form of openings in the lifting cap itself, which are intended to retard terminal flow; it will be noted that when such vent openings are provided, a considerable amount of vapor escapes through such openings on initial heating, and this retards the initial heat-up and flow in the prior art constructions. This condition does not obtain in the instant construction wherein an initial, vapor path of high resistance is provided by the column of liquid in the passage 72, and wherein it is necessary for any small bubbles of air to find their way through the opening 84 into the passage 72 and up through the column of liquid therein in order to escape. Therefore, few initially formed air bubbles are lost, hence, initial flowing starts promptly on the liquid being heated sufficiently. Further if vent openings in the lifting cap are utilized to permit the escape of vapor at the terminal portion of the operating period, it will be observed that such openings will not satisfy the requirements of preventing the entrapment of air on initial filling, for a film of liquid will form over the lifting cap and prevent air from escaping initially. Therefore, it is apparent that if vent openings in the lifting cap are utilized for venting purposes, they still will not prevent the formation of entrapped air on initial filling, and they will not reduce preheat time for they will allow vapor to escape initially.

The improved liquid heating and metering construction provides the additional conveniences when utilized in the referred-to, coffee maker application of affording a convenient means for holding down and/or removing the valve assembly during filling or when removing it for cleaning, respectively, without requiring the user to wet her hands. Also the upwardly extending tube 68 may be provided with markings 96 (see Fig. 5) which will function to apprise the user of the quantity of liquid which is present in the liquid compartment 34.

It will be apparent from the foregoing that an improved liquid heating and metering construction has been provided which is of general utility, and which is of particular usefulness when incorporated in an automatic, electric, drip-type coffee maker. It will further be apparent that a construction has been provided which: (1) provides for substantially uniform metering of liquid heated to a substantially uniform temperature; (2) reduces preheat time to a minimum and, therefore provides quick operation, because of the lack of any substantial avenue of vapor escape during the initial portion of operation; (3) eliminates any initial undesirable flow of unheated water due to the positive venting provided by the valve tube, which precludes the formation of entrapped air, and (4) retards the tendency for increased rate of flow during the terminal portion of the operation, due to the vapor bypass provided by the reduced column of liquid in the valve tube. A benefit of the foregoing which is particularly pertinent in the coffee maker application is to equalize the flow rate over the entire operation, thereby permitting the flow rate to be held at a value which will insure that all of the heated water will flow through the coffee basket and not over flow. Lastly, the additional convenience of providing a facile handling means for removing the value assembly has been provided which also lends itself to the ready, logical incorporation of liquid level markings, which serve as an effective indicator for the amount of liquid in the liquid compartment.

As will be evident from the foregoing description, certain aspects of my invention are not limited to the particular details of construction of the example illustrated, and I contemplate that various and other modifications and applications will occur to those skilled in the art. It is, therefore, my intention that the appended claims shall cover such modifications and applications as do not depart from the true spirit and scope of my invention.

What I claim as new and desire to secure by Letters Patent of the United States is:

1. A liquid heating and metering device comprising: walls defining a liquid receiving compartment; said walls including a bottom wall having an opening therein and a valve seat surrounding said opening; a unitary valve assembly comprising a tube having a valve plug supported at one end thereof and a disc-like, lifting cap supported near said valve plug; said valve assembly being separated from said walls, but adapted to be removably mounted in said compartment with said valve plug supported on said valve seat, said tube extending vertically, and said lifting cap spaced from said bottom wall, to thereby close said opening and temporarily form a lower liquid heating chamber beneath said lifting cap and an upper liquid storage chamber above said lifting cap; said lifting cap and bottom wall being spaced to form a communicating slot between said chambers, said valve tube having a passage that connects said liquid heating chamber and said liquid storage chamber above the normal level of liquid; and means for heating said liquid heating chamber; whereby liquid may be filled in said compartment, but due to the presence of said passage, on such filling, air is not trapped under said lifting cap, and whereby on subsequent energization of said heating means, the liquid in said liquid heating chamber is heated to boiling, thereby causing an upward force on the lower face of said lifting cap which ultimately raises the valve assembly and dislodges said valve plug off of said valve seat, and allows heated liquid to flow downwardly through said opening.

2. A device as defined in claim 1 wherein said lifting cap is imperforate and co-operates with said bottom wall to define said temporary chambers and said slot which connects said chambers.

3. A device as defined in claim 1 wherein said passage constitutes the sole means of communication between said chambers, other than said slot, and wherein after initial filling, said passage houses a column of liquid which automatically maintains itself at the same level as that of the liquid in said liquid storage chamber whereby it functions during the initial portion of operation to prevent any substantial escape of vapor through said passage and thereby reduces the amount of time required before heated liquid flows.

4. A device as defined in claim 1 wherein after initial filling said passage houses a column of liquid which reduces as operation progresses along with the level of liquid in said liquid storage chamber, whereby said column of liquid at the terminal portion of operation functions to facilitate escape of vapor through said passage and thereby counteracts the tendency for continuous terminal flow.

5. A device as defined in claim 4 wherein control means are provided and function to reduce the heat output of said heating means during terminal operation, whereby the tendency for continuous terminal flow is further counteracted.

6. An automatic electric coffee maker comprising: a lower receptacle adapted to collect coffee brew; a coffee basket adapted to house ground coffee and disposed at the top of said receptacle; and an upper water storage and heating reservoir disposed above said receptacle and said coffee basket; said reservoir including a water receiving compartment having a bottom wall that is spaced above said coffee basket and is centrally configured so as to form an opening that communicates with said coffee basket, and an upwardly facing valve seat around said opening; a unitary valve assembly comprising an elongated tube which at one of its ends supports a valve plug, and near said end supports a disc-like, lifting cap; said valve assembly adapted to be removably mounted in said water receiving compartment with said valve plug seated on said valve seat and closing said opening, and said lifting cap spaced above said bottom wall and co-operating therewith to temporarily form a water heating chamber under said lifting cap, a water storage chamber above said lifting cap, and a slot which places said chambers into communication with each other; said tube having a passage that connects said chambers; and said reservoir including means for heating the water in said water heating chamber; whereby prior to operation of the coffee maker, said water receiving compartment may be filled with water up to a level below the point where said passage communicates with said water storage chamber, and during such filling water will flow through said slot and fill said water heating chamber without trapping any air under said lifting cap due to the escape of said air up through said passage, and whereby on energization of said heating means the water in said water heating chamber is heated to boiling, thereby causing an upwardly directed force on the lower face of said lifting cap which ultimately raises the valve assembly and dislodges said valve plug off of said valve seat, thereby allowing heated water to flow through said opening into said coffee basket, and wherein on the occurence of said flow of heated water, additional cool water flows from said water storage chamber through said slot and fills said water heating chamber, and the upwardly directed force on said lifting cap terminates and allows said valve assembly to lower by gravity until said valve plug reseats on said valve seat, whereby the coffee maker at this point in operation is ready to heat and meter the water in the water heating chamber in substantially the same manner as the first volume of water was heated and metered, whereby the entire operation is one of heating and metering at a substantially uniform rate water heated to a substantially uniform temperature until all of the water in said compartment has been heated and metered to said coffee basket, wherein it has seeped through the ground coffee and fallen into said lower receptacle where it has been collected.

7. A device as defined in claim 6 wherein said tube has indicia formed on its exterior surface which comprise means for ascertaining the amount of water initially filled in said compartment.

8. A device as defined in claim 6 wherein said passage constitutes the sole means of communication between said chambers other than said slot, and wherein after initial filling of said compartment said passage houses a column of water which automatically maintains itself at the same level as that of the water in said water storage chamber, whereby said column functions during initial operation of said coffee maker to prevent the escape of vapor through said passage, thereby reducing the amount of time required before heated water flows, and whereby said column functions during terminal operation of said coffee maker to facilitate escape of vapor through said passage, thereby counteracting the tendency for continuous terminal flow.

9. A device as defined in claim 8 wherein said coffee maker includes control means which function to reduce the heat output of said heating means during terminal operation of said coffee maker, thereby further counteracting the tendency for continuous terminal flow.

References Cited in the file of this patent

UNITED STATES PATENTS

| | | |
|---|---|---|
| 2,029,596 | Smith | Feb. 4, 1936 |
| 2,523,261 | Alvarez | Sept. 26, 1950 |
| 2,718,223 | Alvarez | Sept. 20, 1955 |